(12) United States Patent
Dubin et al.

(10) Patent No.: US 6,927,912 B2
(45) Date of Patent: Aug. 9, 2005

(54) OPTICAL DEVICES EMPLOYING BEAM FOLDING WITH POLARIZING SPLITTERS

(75) Inventors: Matthew Dubin, Scottsdale, AZ (US); Brent Larson, Cave Creek, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/618,254

(22) Filed: Jul. 11, 2003

(65) Prior Publication Data

US 2004/0075903 A1 Apr. 22, 2004

Related U.S. Application Data

(63) Continuation of application No. 09/751,339, filed on Dec. 29, 2000, now Pat. No. 6,597,504.

(51) Int. Cl.[7] .......................... G02B 27/28; G03B 21/14
(52) U.S. Cl. ...................... 359/494; 359/485; 359/900; 353/20
(58) Field of Search ................................ 359/483, 485, 359/487, 494, 900; 353/20

(56) References Cited

U.S. PATENT DOCUMENTS

| | | | | |
|---|---|---|---|---|
| 2,449,287 A | | 9/1948 | Flood | 88/65 |
| 2,958,258 A | * | 11/1960 | Kelly | 348/758 |
| 5,381,278 A | | 1/1995 | Shingaki et al. | 359/256 |
| 5,530,586 A | | 6/1996 | Yasugaki | 359/364 |
| 5,833,360 A | | 11/1998 | Knox et al. | 362/293 |
| 5,844,530 A | | 12/1998 | Tosaki | 345/8 |
| 5,900,976 A | * | 5/1999 | Handschy et al. | 359/495 |
| 6,064,523 A | | 5/2000 | Budd et al. | 359/485 |
| 6,108,132 A | | 8/2000 | Itoh | 359/487 |
| 6,147,802 A | | 11/2000 | Itoh et al. | 359/500 |
| 6,310,713 B2 | | 10/2001 | Doany et al. | 359/247 |
| 6,331,916 B1 | * | 12/2001 | Mukawa | 359/630 |

FOREIGN PATENT DOCUMENTS

| | | | | |
|---|---|---|---|---|
| WO | WO-96/20422 | 4/1996 | | G02B/27/28 |
| WO | WO-98/08118 | 2/1998 | | G02B/5/30 |

OTHER PUBLICATIONS

Swift, D. W., "Image rotation devices—a comparative survey", *Optics and Laser Technology, 4,* Butterworth Scientific Ltd.,(1972),pp. 375–376.

* cited by examiner

*Primary Examiner*—John Juba, Jr.
(74) *Attorney, Agent, or Firm*—Schwegman, Lundberg, Woessner & Kluth, P.A.

(57) ABSTRACT

A beam folder increases optical length with polarizing beam splitters and reflectors that repolarize a beam by retarding it. An incident beam encounters the beam splitters multiple times, and are both passed and rejected by the same splitters. The splitters and repolarizing reflectors can be shaped to perform optical functions in a smaller volume. Valves and controls can varyl the beam intensity and combine multiple beams. Applications include projection, imaging, collimating, mixing, and balancing.

22 Claims, 8 Drawing Sheets

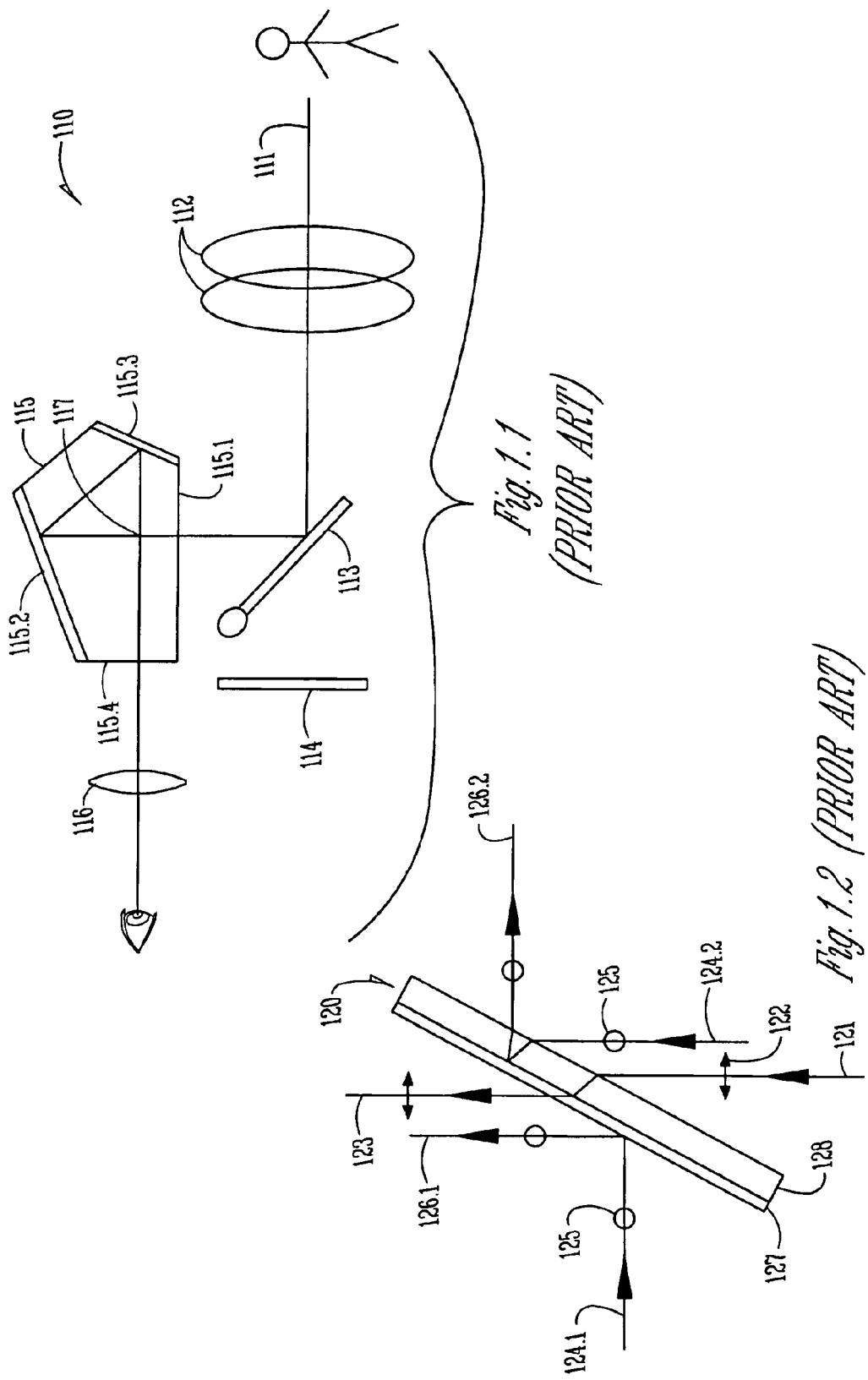

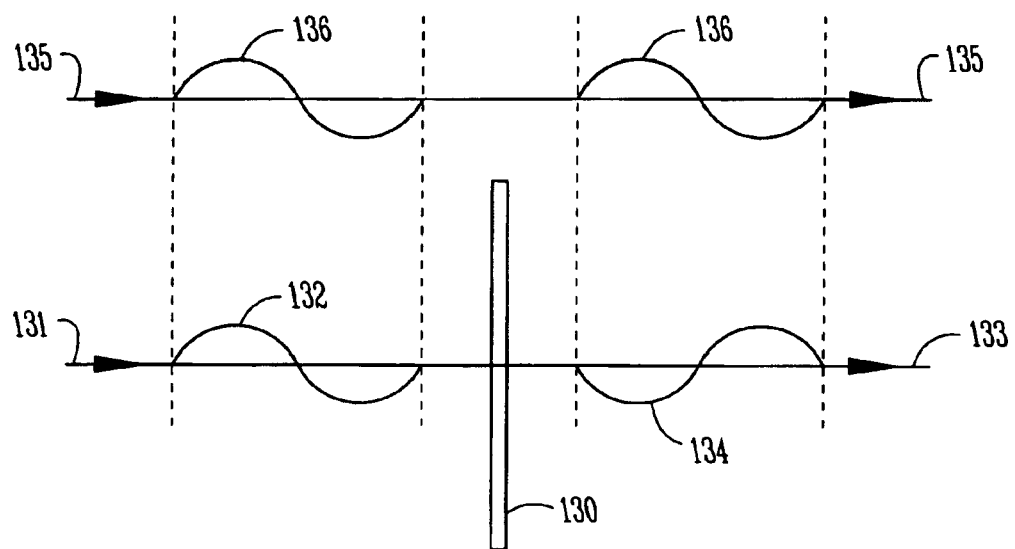
Fig. 1.3
(PRIOR ART)
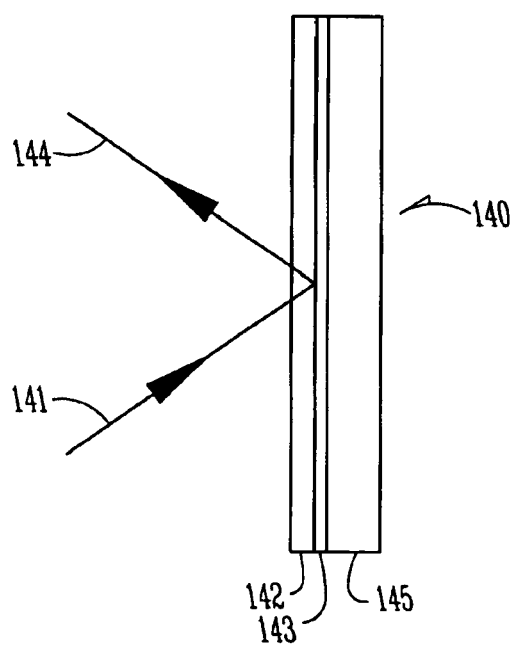
Fig. 1.4
(PRIOR ART)

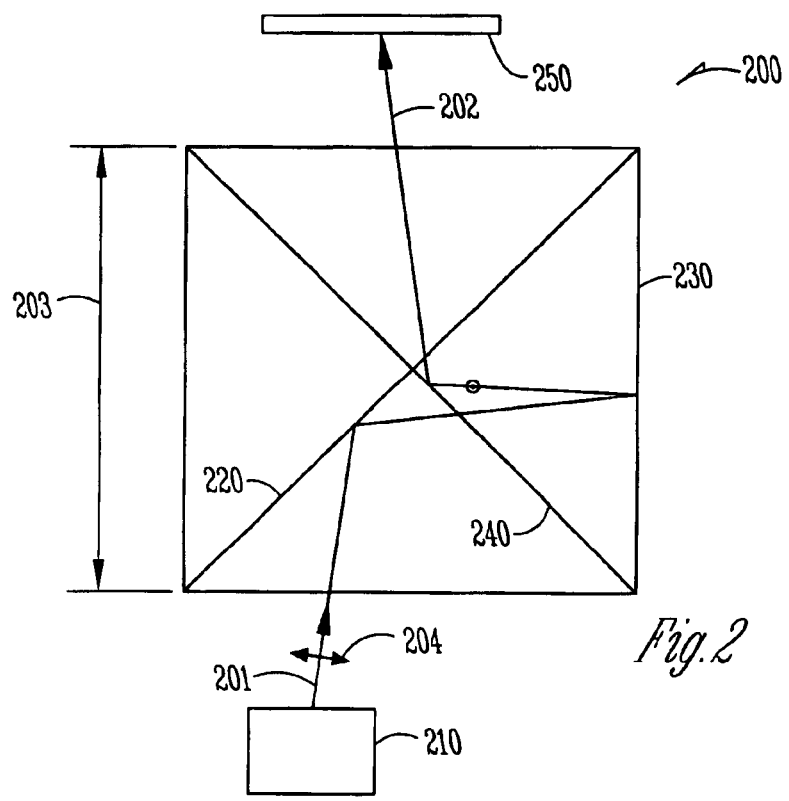
Fig.2
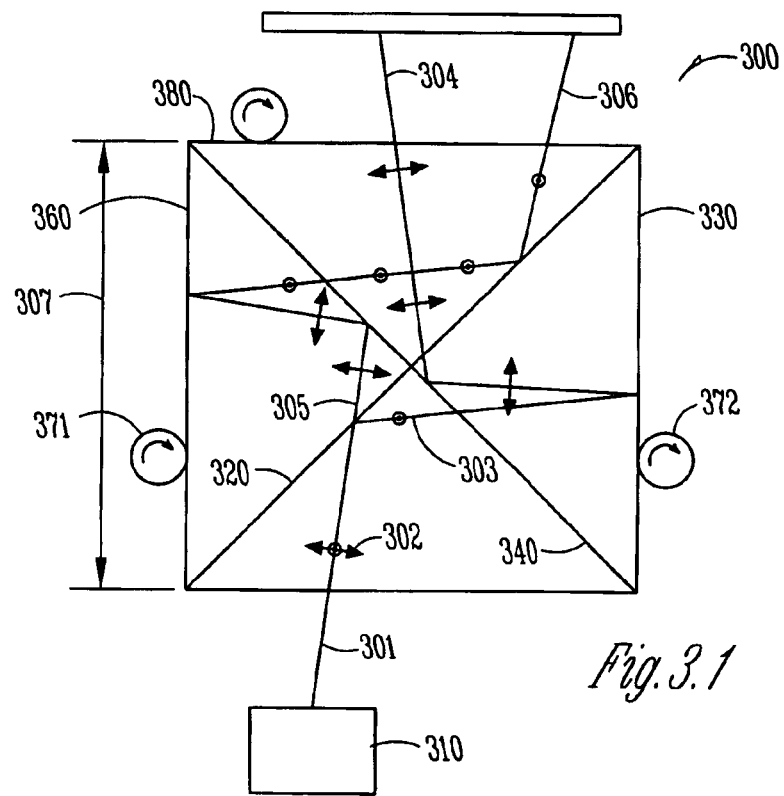
Fig.3.1

OPTICAL DEVICES EMPLOYING BEAM FOLDING WITH POLARIZING SPLITTERS

This application is a continuation of U.S. application Ser. No. 09/751,339 filed on Dec. 29, 2000 now U.S. Pat. No. 6,597,504 which is incorporated herein by reference.

TECHNICAL FIELD

The present invention relates to optical systems, and more particularly concerns devices for folding an optical beam so as to increase its beam length.

BACKGROUND

Many devices for processing optical beams have significant size restrictions, yet require relatively long lengths for the beams inside the devices.

A common technique for increasing the length of a beam within an optical device is to fold the beam inside the device. Binoculars, for example, commonly reflect incident optical beams in a "Z" shape to increase their optical length while keeping their physical length small. Many reflex cameras employ a pentaprism to increase the optical length of their viewfinders within a small camera body. Projection systems of various kinds attain wider deflection angles in a shorter distance from projector to screen by folding their beams internally. Projection television receivers, for example, frequently employ shaped mirrors to fold the beams traveling from the guns to the screen. Collimators and other types of devices can achieve increased beam length by folding incident optical beams within the devices. Heads-up displays and helmet-mounted military optics require multiple optical functions in a small volume. Other kinds of radiation beams, such as x-rays and electron beams, can also be processed by folding them in suitable devices.

A number of conventional devices fold optical beams with plane mirrors or other reflectors. Beam folders implemented with conventional reflectors generally do not save large amounts of space. That is, at least one physical dimension of such a device remains a large fraction of the effective optical length within the boundaries of the device. Other conventional folding devices employ beam splitters. These devices can significantly increase optical length compared to their physical dimensions. However, beam splitters typically suffer from low optical efficiency. The intensity of the output beam is frequently only a small fraction of the incident beam's strength. In adsdition, such devices do not perform other optical functions within the device. Their only function is to increase path length; any further beam manipulation must be accomplished separately, thus increasing the overall volume of the device.

SUMMARY OF THE INVENTION

The present invention offers optical devices for increased optical length in restricted volumes using polarizing beam splitters reflectors that repolarize or convert the polarization of an incident beam, thus providing greater optical manipulation of the beam in a given physical space. Some of the devices employ polarized beams, others operate with non-polarized beams.

Devices according to the invention include one or more polarizing beam splitters each having a pass axis that transmits one polarization of an incident beam through the splitter, and a rejection axis that reflects a different polarization from the splitter in a different direction. Devices incorporating the invention also include one or more repolarizing reflectors, that is, reflectors that change both the direction of an incident beam and its polarization. These elements are configured to transmit an incident beam entering the device among each other so that one or more of the splitters both passes and rejects the beam because of a polarization change in one or more of the reflectors.

The invention finds utility in optical systems for many applications, such as projectors, imagers, collimators, and manipulators of optical and similar radiation. The terms "optical" and "light" must be taken in a broad sense as including any wavelength and type of radiated energy.

BRIEF DESCRIPTION OF THE DRAWINGS

FIGS. 1.1–1.4 show optical elements for illustrating concepts used in the invention.

FIG. 2 is a schematic diagram of a beam-folding device showing one form of the invention.

FIG. 3.2 shows a compound device using multiple devices of the form shown in FIG. 3.1.

ENVIRONMENT

Figure 3:
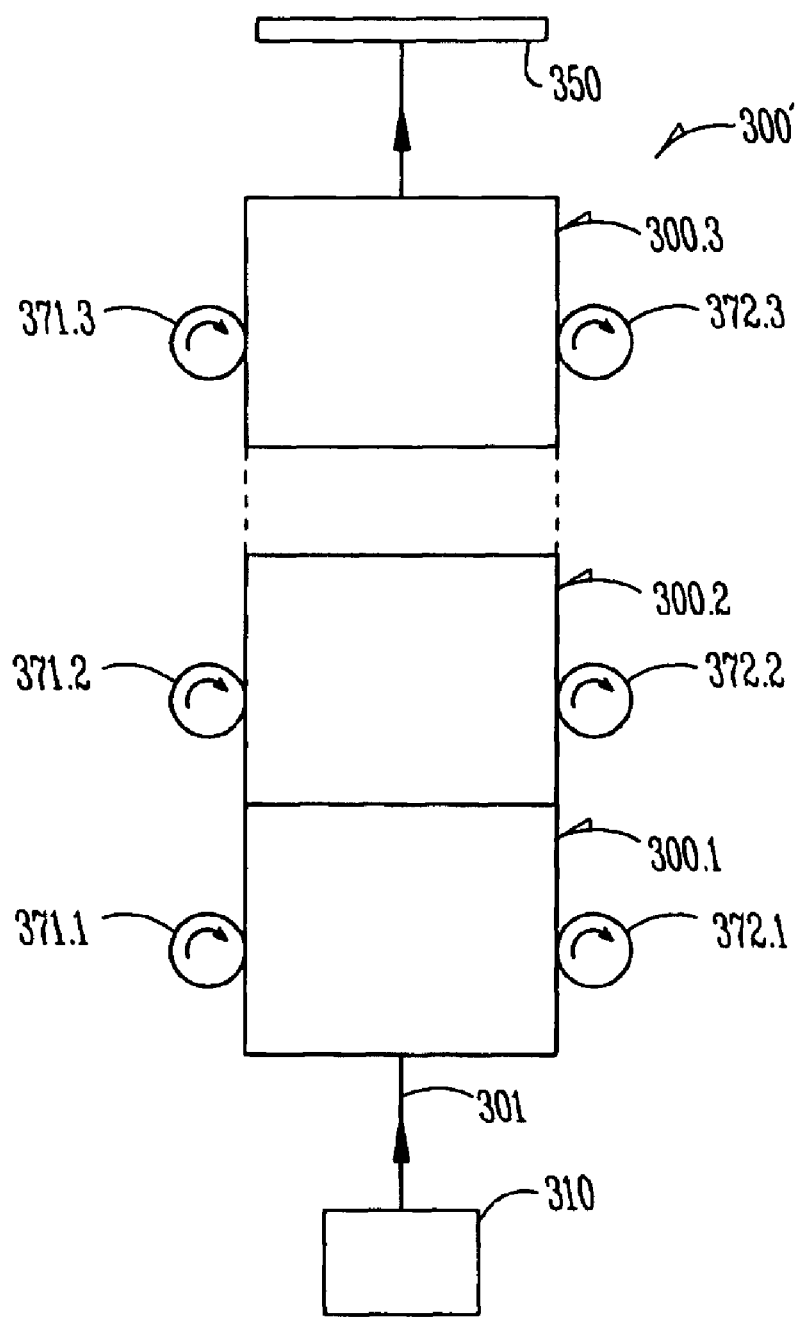
FIG. 3.1 is a schematic diagram of another form of the invention.

FIGS. 1.1–1.4 illustrate conventional components and concepts useful in describing the invention. A beam or ray entering a component or device described herein is an incident beam. When the beam portion leaving the device is called out separately, it is termed the exit beam. Beams are shown as light-weight lines in the drawing. A beam may have its direction, polarization, and/or other properties modified when it encounters a component within a device or a surface thereof. When polarizations are indicated in the drawing arrows and circles represent different polarization directions or modes. These directions are arbitrary, and different symbols merely signify that the designated polarization modes differ from each other. For example, a beam said to be horizontally polarized may have any direction with respect to an optical device; the only significance of the designation is that its polarization is opposed to a beam in the same device that is termed vertically polarized. The terms 'S' and 'P' are sometimes used for these modes. Polarization can also occur in mutually opposed right- and left-hand circular and elliptic modes. The description below will focus upon beams in the optical range of electromagnetic wavelengths. The invention also applies to other ranges of electromagnetic radiation, such as x-rays or radio waves. It can also apply to waves of other kinds, such as acoustic energy. Optical components such as reflectors and splitters have analogs known to those skilled in these fields of technology.

FIG. 1.1 is a schematic diagram of a typical pentaprism optical device for increasing optical length for the viewfinder of a single-lens reflex camera, indicated generally by the numeral 110. An incident optical beam or ray 111 enters camera lens 112 and reflects from hinged mirror 113 in front of film plane 114. The beam enters pentaprism 115 through lower face 115.1, then encounters a reflective coating on face 115.2. The beam reflects to another face 115.3 that also has a reflective coating. Faces 115.2 and 115.3 are angled so that the beam exits the prism through rear face 115.4 in a direction perpendicular to the direction from which it entered the prism. Finder lens 116 then forms a small upright image for the viewer.

Thus, the travel distance of beam 111 is increased significantly over what it would be by merely reflecting beam 111 from a mirror placed at 117. The pentaprism folds beam 111 so that its length inside the prism device is significantly greater than an associated physical dimension of the device. This dimension is normally a physical length or width of a device. In prism 115, the associated dimension is the distance from entrance face 115.1 to point 117, plus the distance from 117 to exit face 115.4. That is, the applicable dimension is the distance the beam would have traveled within the device had it not been folded. Thus, folding makes the optical length greater than the physical dimension of the device. This description employs the term "beam length" to denote the distance traveled by a beam inside the device. In optics technology, the term "path length" denotes this optical distance, but also takes into account the index of refraction of the material through which the beam passes. In the present context, this difference is usually small.

FIG. 1.2 is a schematic view of a conventional polarizing beam splitter 120. An incident beam 121 having a polarization indicated by arrows 122 is transmitted or passed through the splitter as exit beam 123 having substantially the same direction as the incident beam. An incident beam 124.1 or 124.2 having a different or opposite polarization, indicated by circles 125, is rejected by the splitter—that is, reflected from it in a different direction, as shown for exit beam 126.1 or 126.2. The polarization mode that the splitter transmits or passes is called its pass axis; the mode that it reflects or rejects is its rejection axis. The pass and rejection axes of a polarizing beam splitter are generally perpendicular to each other, although it is possible that they might have some other angle with respect to each other. For circular polarization, the pass axis could be a right-hand polarization mode, while the rejection axis would be an opposite left-hand mode. That is, the term "axis" does not necessarily denote a linear or other literal direction, and can be taken as synonymous with a polarization mode.

Polarizing beam splitters can be constructed in a number of ways, such as with an active layer 127 providing a polarizing beam-splitting function on a glass or other transparent substrate 128 that provides mechanical strength. Although certain specific forms are portrayed here, any construction is useful in connection with the invention. The splitters described here transmit one polarization mode with its direction unchanged, and reflect another mode at an angle equal to its angle of incidence. The significant point, however, is that different polarizations are separated into beams having different directions or locations. Therefore, the terms pass and rejection axes denote in a general sense the orientations of the different effects that the splitter has upon waves of a given polarization, and are not limited to the transmission and reflection of different polarizations at particular directions or angles.

FIG. 1.3 depicts one form of wave-repolarizing component 130. Such a component alters the phase of a wave passing through it by a certain amount, usually expressed as a fraction of a wavelength or an angle. In the plate shown schematically as 130, for example, incident beam 131 encounters the plate with a phase shown at 132, and emerges as an exit beam 133 with a retarded phase indicated at 134. A reference beam 135 not passing through the plate is shown for comparison. The phase 134 of exit beam 133 is 180° or one-half wavelength out of phase with respect to the phase 136 of the reference beam. Plate 130 is therefore called a half-wave retarder. Other phase amounts are common; quarter-wave (90°) retarders, e.g., are used in many applications. Retarders have the effect of changing the polarization mode of an incident wave or beam. A half-wave retarder, for example, converts or rotates a horizontally polarized beam to a vertically polarized one and vice versa, when properly oriented. Right- and left-hand circularly or elliptically polarized waves are also interconverted to their opposite modes by a halfwave retarder. Some specific forms of retarder are discussed below, but any type can be employed. Moreover, other conventional methods of altering the polarization of a wave can be turned to use in the invention.

FIG. 1.4 is an enlarged partial view of one form 140 of a single optical element for performing two operations in the present invention. Element 140, termed a reflecting repolarizer, both reflects an incident wave 141 and modifies its polarization mode. Beam 141 first passes through a layer 142 that retards it by a quarter wavelength in a wavelength range of interest. Beam then reflects from layer 143 to form exit beam 144 having an angle equal to the incidence angle of beam 141. Because the beam passes through layer 142 twice, its total retardation is a half wavelength, and its polarization mode is opposite that of the incident beam 141, the same as in FIG. 1.3. Beam 141 reflects from the front surface 143 of layer 145. Although a rear-surface reflector is also possible, front-surface reflectors are usually more efficient. Such a reflecting repolarizer provides two operations required for path-length enhancement in the present context packaged in a single optical element that can be constructed and positioned as an integral unit, thus saving both expense and space. The two operations are also performed nearly simultaneously, so that untoward effects cannot intervene to upset their alignment or mutual cooperation. A device according to the invention, however, can also employ two separate components for the operations of reflecting a beam and modifying its polarization; the term "reflecting repolarizer" must be understood to embrace any device or combination of devices that perform these two functions.

DETAILED DESCRIPTION

FIG. 2 shows schematically an optical device 200 for folding an incident beam 201 to produce an exit beam having a beam length greater than an associated dimension 203 of the device. Light 201 from any type of source 210 has a polarization indicated at 204. The source could be inherently polarized, or a conventional analyzer (not shown) could be placed in the path of incident beam 201 into or within device 200, even at the exit. The polarization mode is arbitrary; it could be linear vertical or horizontal, circular right- or left-handed, etc. A polarizing beam splitter 220 is positioned so that its rejection axis lies along the polarization mode of beam 201. Therefore, the beam is reflected from splitter 220. The reflected beam then passes through polarizing bean splitter 240, whose rejection axis is perpendicular to that of splitter 220, and encounters a reflecting repolarizer 230. The beam, now having a different or opposite polarization, as symbolized at 205, next encounters polarizing beam splitter 240 having its pass and rejection axes positioned so that the beam is now rejected. When the beam again encounters the first splitter 220, its polarization is now aligned with its pass axis. Thus the beam is transmitted through splitter 220, and leaves device 200 as exit beam 202 directed toward a target, shown schematically at 250. For convenience, FIG. 2 symbolizes the pass and rejection axes of the splitters with the same polarization symbols used for the beam. If the angle or position of input beam 201 changes, say to the right in FIG. 2, the incident beam might first encounter splitter 240, which would pass it to splitter 220, which would reject it to repolarizer 230. The repolarizer would reflect the beam back to splitter 220, which would now pass it to splitter 240 to be there rejected and sent out of the device at the top. That is, the order of encounters can change, but the effect remains the same.

The optical length of beam 210 within device 200 is twice the physical length 203 of the device, with no significant optical losses. Splitters 220 and 240 are depicted as perpendicular to each other, and diagonal (here, about a 45° acute angle) to reflecting repolarizer 230, in the style of an X-cube combiner. The axes of the crossed splitters are orthogonal to each other: the rejection axis of one is the same as the pass axis of the other, and vice versa. The beam encounters each splitter twice, and the repolarizer once. Each splitter both passes and rejects the beam, at different points along its path. Obviously, the axes of both splitters could be interchanged, or the beam polarization could be rotated. In that case, the beam would first pass through splitter 220, then be rejected at 240, and so on. Repolarizer 230 would then be placed at the other side of the device.

Most substances employed as polarizing beam splitters are isotropic, and have no intrinsic pass and rejection axes. Some materials, such as flexible plastic sheets sold under the name "Dual Brightness Enhancing Film" (DBEF) by Minnesota Mining & Manufacturing Co., are inherently anisotropic, and can serve in the invention as polarizing beam splitters by themselves. That is, the material itself has pass and rejection axes, and does not require additional components such as half-wave retarders in order to form a polarizing beam splitter. This property significantly decreases weight and size. DBEF film performs well in the visible-light range, has a large acceptance angle, and is inexpensive. Methods for preparing it for use in the invention are discussed in connection with FIG. 10.

Device 200 might find application in a projection system, for example. Light source 210 would be a projector, and target 250 a screen. The entire system may fit behind the image, and the losses are small.

FIG. 3.1 is a schematic representation of a device 300 having a construction similar to that of device 200, FIG. 2. Light source 310 emits a beam 301 that is unpolarized—that is, one having both horizontal and vertical polarization portions, as indicated at 302. One portion 303 is rejected at polarizing splitter 320, passes through splitter 340, reflects with opposite polarity at repolarizer 330, is rejected at splitter 340, passes through splitter 320, and exits to target 350 at 304, as in device 200. Components 320, 330, and 340 are constructed with the same orientations as components 220, 230, and 240; that is, the pass and rejection axes of splitter 320 are interchanged at splitter 340. The other portion 305 of incident beam 301, having as polarization different from that of portion 303, passes through splitter 320, but is rejected at splitter 340. This portion then encounters another reflecting repolarizer 360, changes polarity so that it now passes through splitter 340, reflects from splitter 320, and exits to target 350 as exit beam 306. Splitters 320 and 340 can be fabricated from a film having intrinsic pass and rejection axes, or from other structures, such as tilted sheets or layers having half-wave retarders (not shown).

Device 300 has many applications. It is well known that a long bar can be used as a high-efficiency mixer of multiple beams. Device 300 will perform as a high-efficiency mixer of multiple incident beams 301 from multiple sources 310, but has only half the physical dimension 307 of a non-folded device having an equivalent optical beam length. If repolarizers at 330 and 360 are replaced with repolarizers having a variable phase change or retardation coefficient, then device 300 can function as a variable attenuator or dimmer. Components 371 and 372 symbolize conventional variable attenuators or other controllers for this purpose. In this case, the variable retardation only partially changes the polarization from horizontal to vertical or vice versa, so that the splitters will only pass or reject a fraction of the power in the beams that encounter them for different incident polarizations. Multiple units 300 can be placed in series to obtain a composite device having any required dynamic range. With suitable control of the variable repolarizers, the output beam could be smoothly faded from one polarization through random polarization to another polarization. A variable retarder such as 380 on the output face of device 300 can control the polarization of the exit beam by allowing only one polarization mode to pass. If only one repolarizer, such as 330, can be varied, then two devices in series constitute a dimmer, but only one set 371 of control electronics is required. In the limit, of course, a variable attenuator could be merely an on/off switch—a valve for selectively gating the beam in response to an electrical signal or other agency.

Some forms of polarizing beam splitter operate effectively over only a particular band of wavelengths. If splitters 320 and 340 operate only at one color or other range of wavelength, device 300 is useful to control color balance. If, for example, reflecting polarizers are selected, the amount of red light in the beam can be controlled without affecting green and blue. If this form of device 300 is cascaded with additional units 300 having green splitters and then blue splitters, the composite device can perform mixing, dimming an color balancing at the same time. Cascading optical units mens to position them so that the exit beam of one becomes the incident beam of the next.

FIG. 3.2 shows such a composite device. Individual units 300.1, 300.2, and 300.3 are cascaded, so that the exit beam of one constituent device becomes the entrance or incident beam of the next. Constituent devices 300.1–300.3 have splitters effective over red, green, and blue wavelength bands, respectively. (Other wavelength bands could also be employed.) Controller pairs 371.1/372.1, 371.2/372.2, and 371.3/372.3 vary the retardation of the devices separately, and hence vary the intensity of each color independently. Each constituent unit 300.1, 300.2, and 300.3 transmits two of the three colors as if there were no reflective polarizers— that is, as if their splitters had no rejection axes.

The configuration of device 300' causes the rays to bounce off the reflecting repolarizers of the constituent units at steep angles. It is difficult to obtain high efficiency at both near-normal and large incidence angles. If each unit is constructed of a solid (this term includes a liquid) transparent material having a high refractive index, a low-index coating placed between the solid material and each repolarizer causes the unaffected portions of the beam to be reflected by total internal reflection, a much higher-efficiency mode than grazing reflections. This technique is useful in other embodiments also, and is particularly desirable in devices employed as mixers where some of the incident radiation is not affected by the splitters. If the refractive index of the repolarizers is sufficiently low, then no coating may be needed to achieve total internal reflection. The mirrors of the repolarizers can then be optimized for reflections at near-normal angles at the wavelengths of interest. Depending upon the size and angular extent of source 310, and the number of units in series, a large number of large-incidence angle reflections may occur from the repolarizers; a low-index coating will increase the efficiency of these systems as well.

Tilted transparent plates in an optical system introduce aberrations when beams traverse them at an angle. The aberration that typically has the greatest effect upon image quality is astigmatism. In a composite system 300' where multiple constituent units are cascaded, as in FIG. 3.1, astigmatism can be reduced by orienting the constituent devices in a certain way, as described below in connection with FIG. 4.

Figure 4:
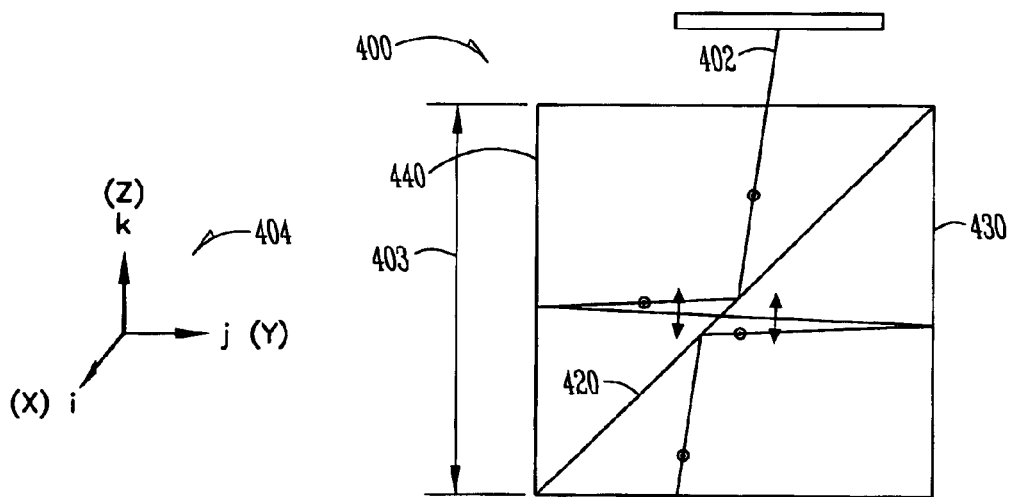
FIGS. 4–9 are schematic diagrams of further forms of the invention.

The devices shown in FIGS. 2–3 have two polarizing beam splitters positioned orthogonally to each other. Employing other numbers of such beam splitters, and/or configuring the beam splitters non-orthogonally to each other, opens up further ways for performing optical functions in a reduced volume. FIG. 4 illustrates a device 400 where the incident beam 401 from source 410 is limited to any predetermined polarization, such as vertical or right-hand circular. A single polarizing beam splitter 420, constructed like splitter 320 or 340, FIG. 3.1, has its rejection axis aligned with the polarization of beam 401. Thus, the beam reflects from the splitter and encounters repolarizer 430. The beam, having had its polarization changed by element 430, now passes through splitter 420, and impinges upon another repolarizer 440. The beam, now modified back to its original polarization direction, is thus reflected again from splitter 420, and exits the device. That is, the beam encounters splitter 420 three different times, being rejected twice and passed once. The two repolarizers are positioned parallel to each other and diagonally to the splitter, so the exit beam 402 leaves in the same direction as incident beam 401 had entered. Here, the beam length is three times the associated dimension 403, the physical length of the device. The modified exit beam 402 departs device 400 in substantially the same direction as the incident beam 401 had entered it.

Other devices, such as 400, can be compounded in the same way as shown in FIG. 3.2. Diagram 404 indicates that the YZ plane is in the plane of the page of FIG. 4. Let the surface normal of splitter 420 be parallel to vector j+k in the standard notation of diagram 404. Orienting the corresponding splitters of further devices (not shown) in the same direction compounds astigmatism through the overall device. However, orienting the splitter of a second device such that its surface normal is parallel to vector i+k (or, equivalently, parallel to −i+k) can significantly decrease the overall amount of astigmatism. Another way to visualize this process is to rotate the second device by 90° in either direction around the Z axis in diagram 404. For hollow component devices, the splitters add astigmatism; cascaded systems employing such devices preferably add them in pairs to cancel the astigmatism.

Figure 5:
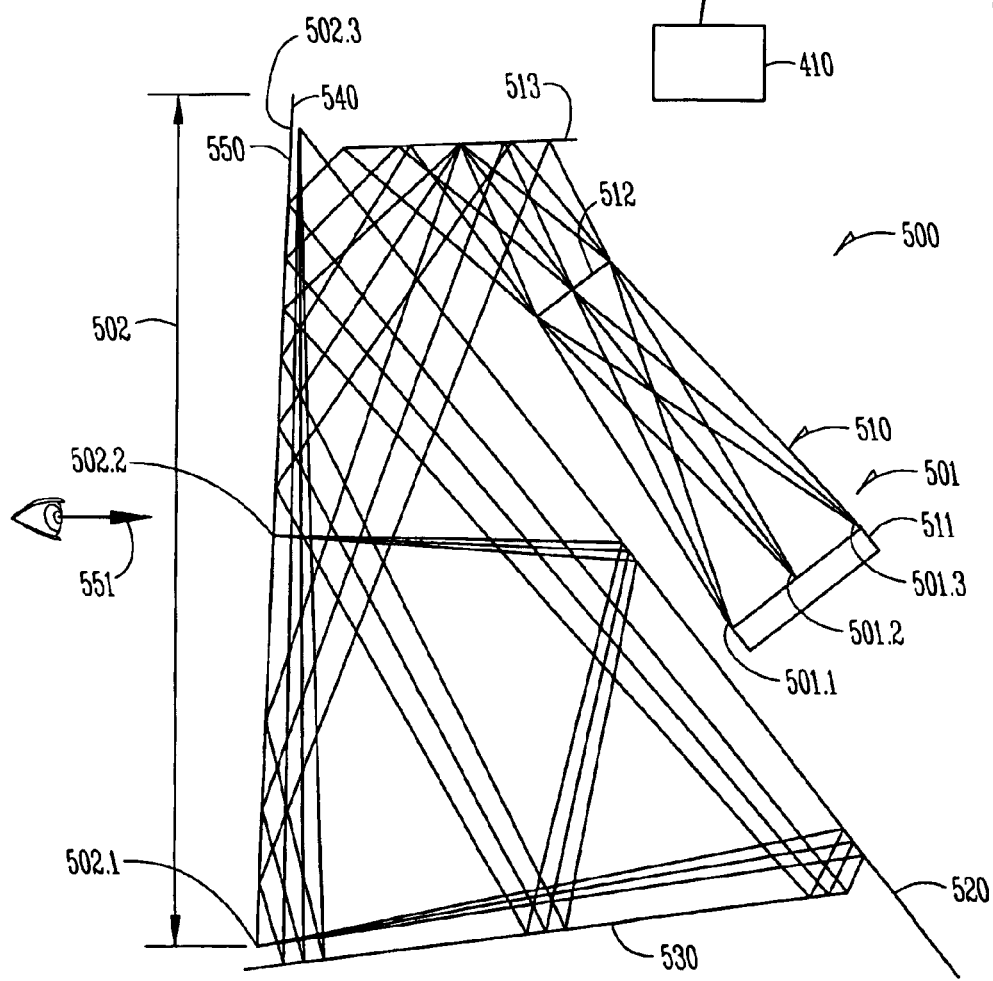

FIG. 5 depicts a device 500 for projecting images from a source 510 onto a target 520. Numerals 501.1, 50.2, and 501.3 symbolize an incident beam 501 of polarized rays from a liquid-crystal display (LCD) 511 or other type of conventional light source 510. Source 510 may include projection or focusing optics such as a projection lens 512 and a folding mirror 513. Lens 512 and mirror 513 are conventional, and may be replaced by other optical components in any convenient arrangement or omitted altogether, depending upon the desired overall configuration of the device 500. In this example, for instance, mirror 513 reduces the overall size of projector 500 by utilizing the otherwise wasted space behind element 530.

The polarized incident beam 501 proceeds from mirror 513 of source 510 to a first polarizing beam splitter 520 having a pass axis positioned with respect to the polarization of beam 501 so as to transmit rays 501.1–501.3 to a second polarizing beam splitter 540. Splitter 540 has a rejection axis aligned in the same direction as the pass axis of splitter 520, or equivalently, a pass axis substantially perpendicular or crossed with respect to the pass axis of splitter 520. Thus, the beam 501 that was passed by the first splitter 520 is reflected from the second splitter 540. Splitters 520 and 540, and other splitters described below for other embodiments, can be constructed of sheets or layers of material having intrinsic pass and rejection axes, or may be fabricated in other ways, as described elsewhere.

Beam 501 then proceeds to a reflective repolarizer 530, which converts its polarization to an opposite mode: horizontal to vertical, etc. (Again, polarization directions or modes are named arbitrarily; only their difference is significant to the invention.) Beam 501 now has a polarization aligned with the rejection axis of splitter 520, which therefore reflects it back toward splitter 540. Because the axes of splitter 540 are crossed with respect to those of splitter 530, the polarization of beam 511 is now aligned with the pass axis of splitter 540. Splitter 540 thus transmits the beam as an exit beam 502 to a transmissive target projection screen 550. Rays 502.1–502.3 correspond to source rays 501.1–501.3 respectively. The planes of splitters 520 and 540, extending out of the page of FIG. 5, are at an acute, non-parallel angle with respect to each other. The particular angle depends upon the desired overall geometry of the system.

The projection optics and configuration of the components is such that the exit beam is focused to form an image upon screen 550 of the image from LCD 511. FIG. 5 shows screen 550 in essentially the same location as the second splitter 540, and is viewed from direction 551. If desired, screen 550 and splitter 540 can be fabricated as a single integrated unit for easier mechanical support. Alternatively, they can constitute separate physical units, or the screen can be separated from splitter 540 and made reflective, so that it is viewed from a direction opposite that of arrow 551. Device 500 illustrates a configuration according to the invention in which the polarizing beam splitters are not perpendicular (i.e., non-orthogonal) to each other, and in which the repolarizer is positioned non-diagonally diagonal (i.e., not at 45°) with either of them. The beam traverses both splitters twice, and is both passed and rejected by both splitters. The folded beam length is again considerably greater than an associated dimension 502 of the device. Splitters for device 500, and for the devices described below, can be formed of a material having intrinsic pass and rejection axes as mentioned above, or from any other single or composite structure that serves as a polarizing beam splitter in the wavelength band of interest.

The systems shown in FIGS. 2–5 have polarizing reflectors that are parallel and planar. Removing one or both of these requirements, however, opens up the possibility of performing other optical functions in a physically smaller device by incorporating them into a beam folder according to the invention. This can be achieved by shaping the components so that the same component performs an optical function or beam manipulation in addition to simple reflection and polarization conversion.

Figure 6:
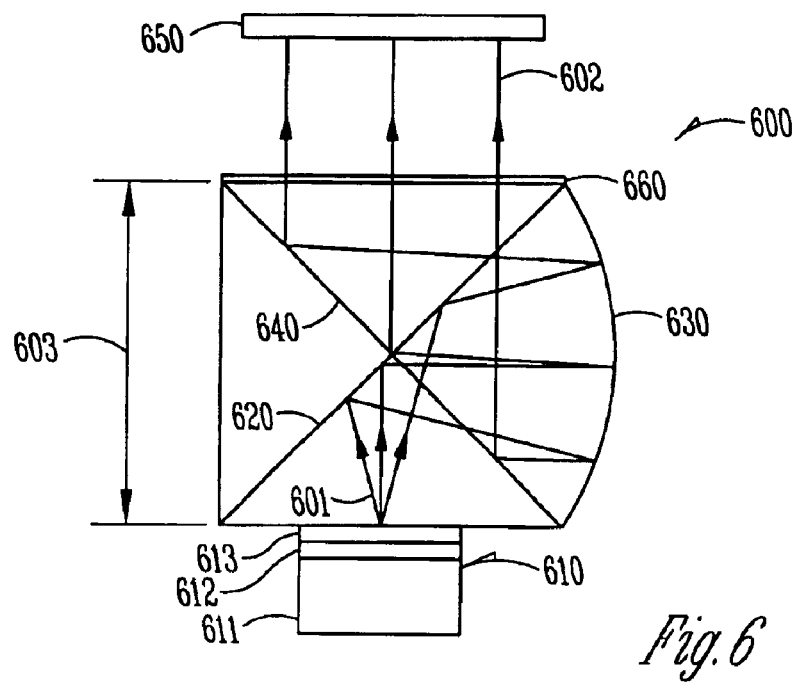

FIG. 6 shows a device 600 useful as an in-line collimator. Radiation source 610 may include an illuminator depicted schematically at 611, a controllable light valve 612, and lenses, filters, or other optical elements 613. Rays of polarized incident beam 601 enter the device at different angles. As in device 200, FIG. 2, the incident beam is rejected by a first polarizing beam splitter 620. (Some of the rays are first passed by a second polarizing beam splitter 640 having its axes crossed with respect to splitter 620.) Element 630 reflects beam 601 and retards it by a total of a half wavelength. This repolarizer, however, is not flat or planar, as were those described earlier. Rather, it has a non-planar shape for manipulating the beam characteristics, by focusing, collimating, or other optical operations. In this example, a parabolic shape of repolarizer redirects all of the incident rays in the same direction, to collimate them. That is, the manipulation takes place in the same optical element as the reflecting and repolarizing operation, and substantially simultaneously therewith, thus combining several operations in a single element for space and cost savings. Having been polarized in a different mode, the beam 501 is now rejected by splitter 640, although some of its rays are first passed by splitter 620.

Rays 602 travel parallel to each other to target 650. Optional optical elements 660 may control or further manipulate exit beam 602 if desired; for example, 660 could denote a light valve. In the illustrated device 600, repolarizer 630 is shaped to achieve collimation of the exit beam. Other effects are possible with other shapes. Of course, a beam traveling in an opposite direction through the device will be affected inversely: parallel incident rays 602 proceeding from a source at the location of target 650 would be brought to a focus at the erstwhile source 610. Repolarizers can be replaceable or controllable for different effects in the same overall device. Repolarizer 630 can be constructed as a separate element of a hollow-cube design, or the face of a solid cube could be made with the appropriate curvature and then coated with retarding and reflective layers. Optical elements such as 612 and 660 can be constructed as separate elements or possibly by forming the entrance and exit faces of a solid cube carrying the elements 620–640. Such elements could be provided to control aberration, for example. Other optical elements, not shown, could further be placed in front of the shaped reflecting repolarizer 630, in the path between it and the splitters 620 and 640. The beam length of device 600 is substantially twice its associated physical dimension 603, thus achieving collimation in a much shorter distance from source 610.

Figure 7:
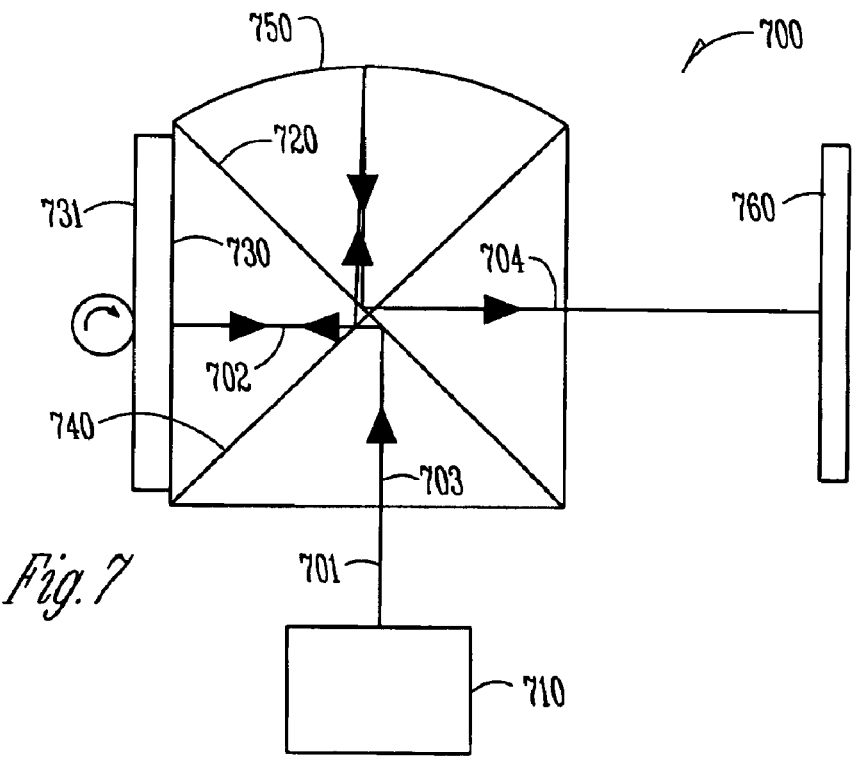

FIG. 7 shows another curved reflecting repolarizer, for applications such as a head-mounted display. In device 700, an incident beam 701 from source 710 has a polarization aligned with the rejection axis of a polarizing beam splitter 720 and with the pass axis of another polarizing beam splitter 740. The beam may encounter either splitter first, but encounters both before encountering reflecting repolarizer 730. In this example, element 730 includes a light valve 731 that can be controlled to alter the retardation of a wave that encounters it. For example, valve 731 might be settable by an electrical signal or otherwise to retard an incident beam by a half wavelength or not at all, or in gradations. One advantage of this configuration is that radiation whose polarization is not changed by valve 731 is returned to source 710, through splitters 720 and 740, along paths 702 and 703. If the source scatters some of this radiation back without preserving its polarization, overall efficiency of device 700 is increased. The optical beam length of device 700 is about three times the associated unfolded dimension. In FIG. 7, this unfolded dimension is the length of incident beam 701 from source 710 to the splitter 720 that first rejects it, plus the length of the exit beam 704 from that splitter to the exit face.

Radiation whose polarization is changed in repolarizer 730 is now aligned with the pass axis of splitter 720 and with the rejection axis of splitter 740. This radiation proceeds to reflecting repolarizer 750, which again changes it polarization. Repolarizer 750 is shown as curved, so that it manipulates the beam in the manner of element 630, FIG. 6, although perhaps with a different result. Radiation then proceeds back to splitters 720 and 740, where it passes through the one that rejected it previously, and is rejected by the one that previously passed it. Exit beam 704 leaves the cube 700 to target 760.

Figure 8:
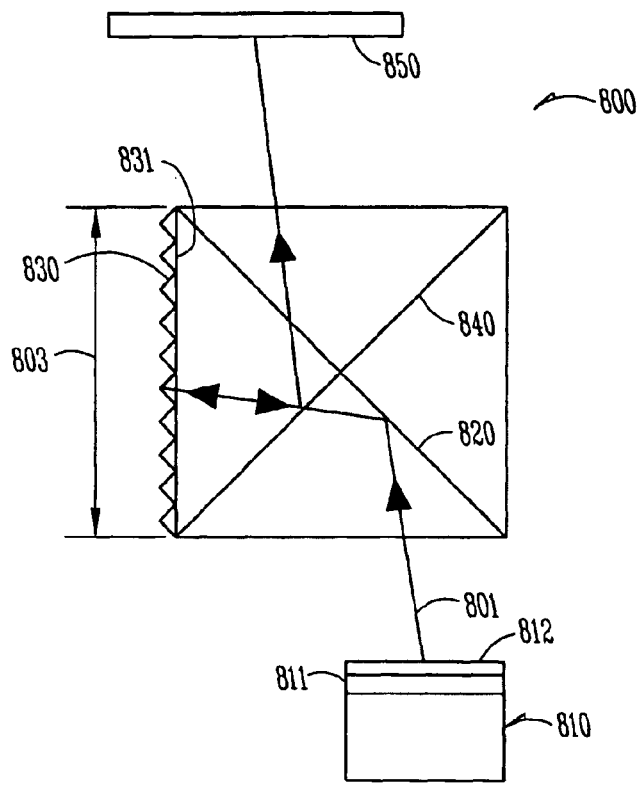

FIG. 8 shows another device 800 that finds application as an in-line collimator. In this example, a polarized incident beam 801 from source 810 is aligned with the rejection axis of polarizing beam splitter 820. The axes of splitters 820 and 840 are crossed, so that beam 801 might encounter and pass through splitter 840 before being rejected in splitter 820. After being reflected from splitter 820, the beam encounters reflecting repolarizer 830. Element 830 is constructed as a retroreflector, so that the beam is reflected in a direction substantially opposite the direction it had arrived; retardation is accomplished with a separate layer 831. Having been retarded so as to change its polarization mode, however, the beam is now rejected at splitter 840 and passed by splitter 820 (perhaps in reverse order). Exit beam 802 passes from the cube to target 850. Retroreflectors can be constructed as a single corner reflector, an array of corners, or in other conventional configurations.

Device 800 as thus far described forms a real image in a compact optical system. The optical beam length is double the associated length 803 of the device. If source 810 includes a collimating lens 811 and a stop 812, an image of the stop is formed on target 850. Such a system offers a large eye relief in a head-mounted display, for example.

Figure 9:
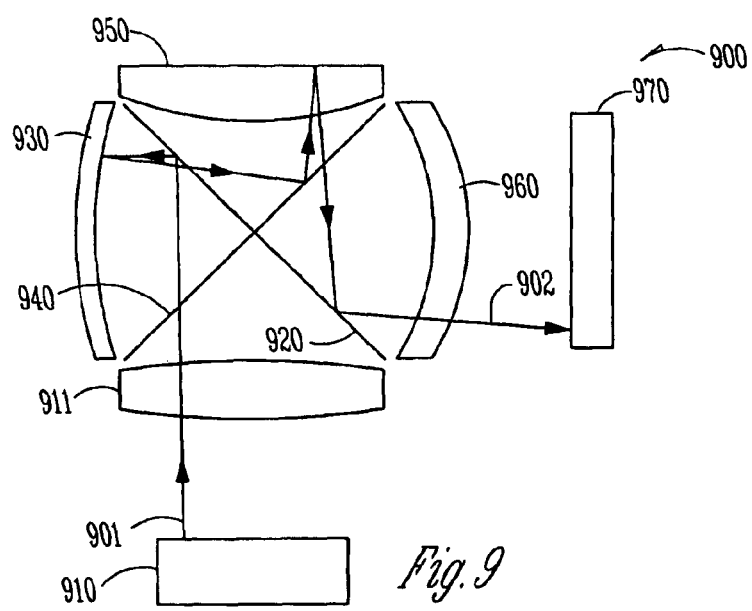

FIG. 9 is an example of a projection device 900 that demonstrates how a large number of functional optical elements can be packed into a small volume using beam folding according to the invention. Polarized light 901 from source 910 is rejected from polarizing beam splitter 920, possibly after passing through splitter 940. The pass and rejection axes of these splitters are crossed, or disposed in different directions. This light encounters curved repolarizer 930, a second-surface mirror that manipulates the beam and reflects it back to the beam splitters in an opposite polarization. If the two faces of element 930 have different curvatures, even further optical manipulation is achieved. On this leg, polarization is aligned with the pass axis of splitter 940 and the rejection axis of splitter 920. Thus the beam passes to repolarizer 950, which is another second-surface mirror having differently curved surfaces. The beam is now aligned with the pass axis of splitter 940, but is rejected upon reaching splitter 920. After passing through another lens 960, the exit beam 902 encounterers target 970, which can be a projection screen.

Figure 10:
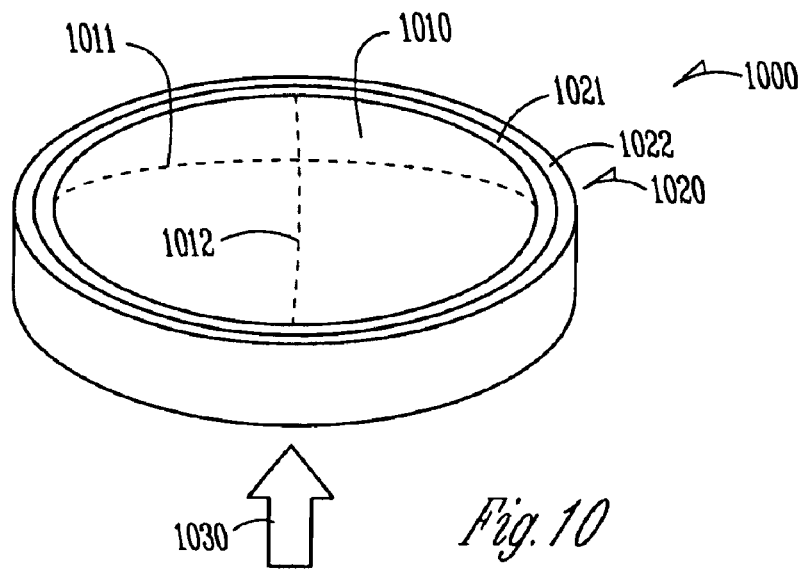
FIGS. 10–11 are diagrams of polarizing beam splitters useful in the invention.

FIG. 10 is a diagram 1000 showing the use of a flexible film 1010, such as the previously mentioned DBEF, as a polarizing beam splitter. The active surface of film 1010 has small ripples, reducing the resolution of an imaging system, and thus limiting usefulness of the film for high-performance devices. Heating the film and placing it under tension greatly reduces the size of the ripples, improving its performance sufficiently for use in optical folding devices that employ the film as an imaging element. The film can be stretched in a number of ways. In FIG. 10, heated film 1010 is held over frame 1021 while frame 1022 is forced over it to produce a seal. Frames 1020 can have shapes other than round, such as rectangular. For some shapes, the film should be cut to relieve areas of large stress, to avoid breakage. Frames 1020 stretch the film in both directions of its plane. In the particular example of DBEF film, the ripples are generally oriented in one direction. If the frames stretch the film only in this direction, performance is still significantly enhanced.

After film 1010 has been stretched, the ripples must be maintained at their smaller size. If the film remains in frames 1020 under tension after it cools, the ripples remain small. Another approach is to laminate the stretched film to a substrate with an adhesive. The film can be laminated on only one side, or on both sides for added strength. Alternatively, a substance such as epoxy can fill a cavity on one or both sides of the film; the epoxy thus provides the structural support necessary to maintain the curvature. Flat splitters can also be fabricated by these methods.

Polarizing beam slitters can be curved as well as flat. Dashed lines 1011 and 1012 indicate the curvature of a sheet. The curvature can be produced by increasing the air pressure, symbolized by arrow 1030 on one side of sheet 1010 while it is held in frame 1020; pressure could also be decreased for curving the film in the opposite direction. The shape of the frames can be configured to determine the properties of the curvature. Round frames produce rotationally symmetric curves, while other frame shapes can produce curvatures having other symmetries. Curved splitter shapes can also be achieved by stretching a suitable film over a solid convex or cylindrical surface having the desired curvature.

Figure 11:
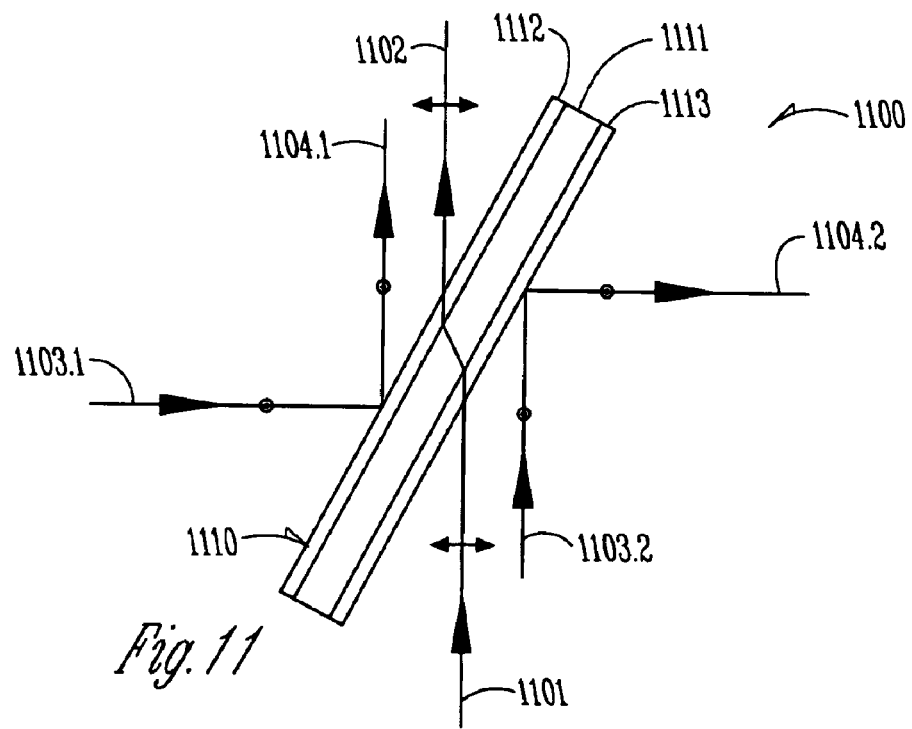

FIG. 11 shows another polarizing optical beam splitter 1100 useful for constructing devices according to the invention. In some applications, it is desirable to fabricate the device as a hollow air-filled cube. This frequently requires that the polarizing beam splitters be supported on a substrate, such as transparent substrate 128 However, tilted transparent plates introduce aberrations when beams traverse them at an angle, as depicted in FIG. 1.2. The aberration that typically has the greatest effect upon image quality is astigmatism. Although incident rejected beam 124.1 is reflected directly from active layer 127, a rejected beam 124.2 approaching from the opposite direction must travel through the substrate twice, suffering a jog with each traversal. A substrate having enough mechanical strength is typically at least three times as thick as the coating or other layer that provides the active beam-splitting function, making the aberrations significant in many applications.

Splitter 1100 in FIG. 11 has a body 1110 made up of a transparent substrate 1111, such as glass, having an active layers 1112 and 1113 on each side. The substrate provides sufficient mechanical strength to hold the active layers in place. The pass and rejection axes of the two layers are aligned with each other, so that a polarization direction that is transmitted through either layer is also transmitted through the other; likewise, any polarization that one layer rejects is also rejected by the other. An incident beam 1101 having a polarization (shown by the arrows) aligned with the pass axis of layers 1112 and 1113 is transmitted through them and through transparent substrate 1111 as exit beam 1102. An incident beam 1103.1 having a polarization (indicated by the circles) aligned with the rejection axis of layer 1112 reflects it to form exit beam 1104.1. An incident beam 1103.2 having the same polarization direction or mode as beam 1103.1, but arriving from the other side of splitter 1110, is aligned with the rejection axis of layer 1113, and reflects from it as exit beam 1104.2. Therefore, neither of the beams 1103.1 and 113.2 need travel through the substrate 1111.

CONCLUSION

The above description is sufficient to allow those skilled in the art to practice the invention. Changes can be made in the structure, materials, and other aspects of the described embodiments without departing from the inventive concept, whose scope is to be measured only by the following claims and their equivalents. The elements of the claims need not be interconnected except as explicitly stated or as necessary to perform their function. Operations need not be performed in any particular order unless a specific sequence is recited or inherent.

What is claimed:

1. An optical device comprising:

a first polarizing beam splitter having first pass and rejection axes, and positioned to receive an incident beam, a second polarizing beam splitter having second pass and rejection axes aligned respectively with the first rejection and pass axes, and positioned at an acute angle to the first splitter;

a repolarizing reflector for interconverting a polarization of the beam between the pass and rejection axes of the beam and positioned so that both beam splitters encounter the beam at least twice;

a source including a focusing element for the incident beam, where the source further includes a folding mirror for reflecting the beam to the first beam splitter.

2. The device of claim 1 where the incident beam is polarized.

3. The device of claim 1 where the screen is positioned at the location of the second beam splitter.

4. An optical device comprising:

a first polarizing beam splitter having first pass and rejection axes, and positioned to receive an incident beam, a second polarizing beam splitter having second pass and rejection axes aligned respectively with the first rejection and pass axes, and positioned at an acute angle to the first splitter;

a repolarizing reflector for interconverting a polarization of the beam between the pass and rejection axes of the beam splitters, and positioned so that both beam splitters encounter the beam at least twice;

a projection screen positioned to receive the beam after it has encountered both of the beam splitters twice.

5. The device of claim 1 where the screen is positioned at the location of the second beam splitter.

6. The device of claim 4 where the incident beam, the splitters, and the reflector are all positioned on the same side of the screen.

7. The device of claim 4 further comprising a source for providing the incident beam, the source being configured to project an image upon the screen.

8. The device of claim 4 where the incident beam is polarized.

9. The device of claim 4 further comprising a source including a focusing element for the incident beam.

10. An optical device comprising:

a first polarizing beam splitter having first pass and rejection axes, and positioned to receive an incident beam, a second polarizing beam splitter having second pass and rejection axes aligned respectively with the first rejection and pass axes, and positioned at an acute angle to the first splitter;

a repolarizing reflector for interconverting a polarization of the beam between the pass and rejection axes of the beam splitters, and positioned so that both beam splitters encounter the beam at least twice, where the repolarizing reflector is positioned non-diagonally with respect to at least one of the beam splitters.

11. The device of claim 10 where the incident beam is polarized.

12. The device of claim 10 further comprising a source including a focusing element for the incident beam.

13. The device of claim 10 where the screen is positioned at the location of the second beam splitter.

14. A method for projecting an image, comprising:

transmitting an incident beam from a source through a pass axis of a first polarizing beam splitter;

reflecting the beam from a rejection axis of a second polarizing beam splitter positioned nonparallel and nonorthogonally with respect to the first beam splitter;

reflecting and repolarizing the beam;

reflecting the beam from a rejection axis of the first polarizing beam splitter;

transmitting the beam through a pass axis of the second polarizing beam splitter to a screen.

15. The method of claim 14 where the reflecting and repolarizing are performed at the same time.

16. The method of claim 14 where the pass and rejection axes of the first beam splitter correspond respectively to the rejection and pass axes of the second beam splitter.

17. The method of claim 16 where the reflecting and repolarizing are performed at the same time.

18. The method of claim 16 where the first and second beam splitters are positioned at an acute angle to each other.

19. The method of claim 14 where the first and second beam splitters are positioned at an acute angle to each other.

20. A method for projecting an image, comprising:

transmitting an incident beam from a source through a pass axis of a first polarizing beam splitter;

reflecting the beam from a rejection axis of a second polarizing beam splitter positioned nonorthogonally with respect to the first beam splitter;

reflecting and repolarizing the beam;

reflecting the beam from a rejection axis of the first polarizing beam splitter;

transmitting the beam through a pass axis of the second polarizing beam splitter to a screen, where the operations are performed in the sequence listed.

21. The method of claim 20 where the reflecting and repolarizing are performed at the same time.

22. The method of claim 20 where the first and second beam splitters are positioned at an acute angle to each other.

* * * * *